US007186467B2

(12) United States Patent
Nakamaru et al.

(10) Patent No.: US 7,186,467 B2

(45) Date of Patent: Mar. 6, 2007

(54) BLACK ZINC-PLATED STEEL SHEET

(75) Inventors: Hiroki Nakamaru, Fukuyama (JP); Yuuzo Ootuka, Chiba (JP); Takeshi Sakuma, Chiba (JP); Hiroyuki Ogata, Kawasaki (JP); Shigeru Umino, Chiba (JP); Chiyoko Tada, Chiba (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 10/536,564

(22) PCT Filed: Jan. 30, 2004

(86) PCT No.: PCT/JP2004/000951

§ 371 (c)(1),
(2), (4) Date: Jul. 26, 2005

(87) PCT Pub. No.: WO2004/067802

PCT Pub. Date: Aug. 12, 2004

(65) Prior Publication Data

US 2005/0282033 A1 Dec. 22, 2005

(30) Foreign Application Priority Data

Jan. 31, 2003 (JP) ............................ 2003-023467

(51) Int. Cl.

*B32B 15/04* (2006.01)
*B32B 15/08* (2006.01)
*B32B 15/18* (2006.01)

(52) U.S. Cl. ...................... 428/659; 428/624; 428/626; 428/632; 428/336; 428/457

(58) Field of Classification Search ................ 428/681, 428/684, 655, 658, 659, 626, 624, 632, 633, 428/639, 219, 215, 336, 340, 457, 458, 461, 428/469, 470, 472, 472.3, 704
See application file for complete search history.

(56) References Cited

U.S. PATENT DOCUMENTS 5,525,431 A * 6/1996 Kanamaru et al. .......... 428/623

FOREIGN PATENT DOCUMENTS

| | | | |
|---|---|---|---|
| JP | 62-70583 | A | 4/1987 |
| JP | 2000-290783 | * | 10/2000 |
| JP | 2000-290783 | A | 10/2000 |
| JP | 2002-47579 | A | 2/2002 |
| JP | 2002-226783 | A | 8/2002 |

* cited by examiner

*Primary Examiner*—Michael E. Lavilla
(74) *Attorney, Agent, or Firm*—Frishauf, Holtz, Goodman & Chick, P.C.

(57) ABSTRACT

A black galvanized steel sheet including a composite coating layer formed on a surface of a blackened galvanized steel sheet by applying a treatment solution containing a phosphate ion, a vanadate ion, a metal ion, an α,β-unsaturated carboxylic acid and a glycoluril resin; and an organic resin layer formed on the composite coating layer, is provided. The black galvanized steel sheet is excellent in heat absorption and heat dissipation, electrical conductance, and corrosion resistance in a worked portion. Furthermore, the black galvanized steel sheet does not include hexavalent chromium.

17 Claims, 3 Drawing Sheets

BLACK ZINC-PLATED STEEL SHEET

This application is the United States national phase application of International Application PCT/JP2004/000951 filed Jan. 30, 2004.

FIELD OF THE INVENTION

The present invention relates to black galvanized steel sheets, specifically, relates to black galvanized steel sheets which are excellent in heat absorption, heat dissipation, electrical conductance, electromagnetic shielding, corrosion resistance in flat parts and bent parts, and which are available, without painting, as materials for such as housings of electronic equipment generating heat in use, and which do not contain toxic hexavalent chromium.

DESCRIPTION OF THE RELATED ARTS

Based on the recent improvement in the quality of electronic equipment, high heat dissipation from central processing units (CPU) or the like is required. For example, personal computers, especially, desktop personal computers are usually provided with fans to dissipate heat, and an increase in airflow by raising the rotation of the fan adversely causes an increase in noise. Another problem is that it is difficult to install fans in the interior of some electrical equipment such as car audios. If heat dissipation from housing increases, the heat generated in the interior of the equipment can be rapidly diffused to the exterior of the equipment without fans or without an increase in the rotation of the fan through the housings.

From such a viewpoint, steel sheets excellent in heat absorption and heat dissipation have been developed. For example, a steel sheet having a film containing carbon black and titania as pigments is disclosed in Japanese Unexamined Patent Application Publication No. 2002-226783. According to this technique, since individual pigments show the maximum thermal radiation in different infrared-wavelength ranges, a steel sheet having a surface coating layer containing pigments in combination shows a high thermal radiation over a broad wavelength range. When such a steel sheet is used as a material of housings, heat generated in the interior of equipment can be effectively dissipated to the exterior.

However, to achieve a sufficient effect, the film inevitably contains a large quantity of pigments. Therefore, the film is thick and has a problem with a high cost. An additional problem is that electrical resistance of the surface of the steel sheet increases with the increase in the thickness of the film. To prevent a leak of electromagnetic waves generated by electronic equipment, the housings must be surely grounded. Consequently, it is important that the electrical conductance of the surface of the steel sheet is high. The pigments have high heat radiation and are useful for creating high heat absorption and dissipation. However, since the electromagnetic shielding is indispensable for electronic equipment, the use of coating materials including a large quantity of the pigments is limited.

Black galvanized steel sheets have been used for the interior parts of copying machines. The black galvanized steel sheets have not only black appearances and characteristics of low reflectance against visible light but also high thermal emissivity compared with ordinary galvanized steel sheets.

A method for forming a black coating layer on a steel sheet is generally classified as follows:

(a) A method for forming a black coating layer having a thickness of several tens of micrometers by the application of painting compositions containing black pigments such as carbon black by spray coating, roll coating, or the like; and (b) A method for forming a black coating layer by a reaction or electrolysis of a plating layer formed in advance.

Black steel sheets made by method (a) disadvantageously decrease electrical conductance, like the above-mentioned ordinary steel sheets having a painting film containing pigments.

Method (b) has a variety of modification. Recently, methods for forming black coating layers that do not contain hexavalent chromium have been attractive from an environmentalism viewpoint. For example, Japanese Unexamined Patent Application Publication No. 2000-290783 discloses a weldable blackened galvanized steel sheet of non-chromium type which is made of a galvanized steel sheet as a base material. On the surface of the galvanized steel sheet, a metal/oxide composite black coating layer containing elemental nickel and zinc, oxides of nickel and zinc, and optional hydroxides thereof is formed. Moreover, a non-chromium rust proof film layer is formed on the surface. The non-chromium rust proof film layer contains a resin and a thiocarbonyl-group-containing compound and/or a vanadate compound, and optionally contains a phosphate compound and/or particulate silica. An organic resin layer optionally containing a black pigment and/or a rustproof pigment may be applied, if required.

Another instance of a surface-treated metallic material having an excellent black appearance is disclosed in, for example, Japanese Unexamined Patent Application Publication No. 2002-47579. The surface-treated metallic material has a metal oxide layer on a metallic base material including zinc on the surface. The metal oxide layer is formed by displacement deposition with one or more types of metals selected from the group consisting of nickel, cobalt, and iron in an amount of 30 to 200 $mg/m^2$.

The purpose of method (b) is to provide black galvanized steel sheets which are subjected to corrosion-resistance treatments instead of a chromate treatment. These steel sheets have moderate corrosion resistance in flat parts, but insufficient in bent parts.

SUMMARY OF INVENTION

It is an object of the present invention to provide black galvanized steel sheets which are inexpensive and excellent in heat absorption and dissipation, electrical conductance, electromagnetic shielding, and corrosion resistance in flat parts and also in bent parts, and which are available, without painting, as materials for such as housings of electronic equipment generating internal heat, and which do not contain hexavalent chromium.

To achieve the object, the present invention provides black galvanized steel sheets comprising a galvanized steel sheet; a black coating layer formed on the galvanized steel sheet; a composite coating layer formed on the black coating layer and containing a phosphate ion, a vanadate ion, a metal ion, an $\alpha,\beta$-unsaturated carboxylic acid and a glycoluril resin; and an organic resin layer formed on the composite coating layer.

Preferably, the black coating layer is formed by a blackening treatment of the surfaces of the galvanized steel sheet. The thickness of the black coating layer is preferably 0.01 to 0.5 $\mu m$.

Preferably, the composite coating layer has a coating weight of 0.02 to 1 $mg/m^2$.

Preferably, the metal ion in the composite coating layer is at least one selected from the group consisting of magnesium ion, zinc ion, manganese ion, and aluminum ion.

The composite coating layer is formed by applying a treatment solution on the black coating layer, the treatment solution containing a phosphate ion, a vanadate ion, a metal ion, an α,β-unsaturated carboxylic acid and a glycoluril resin.

Preferably, the metal ion in the treatment solution is at least one selected from the group consisting of a magnesium ion, a zinc ion, a manganese ion, and an aluminum ion.

Preferably, the treatment solution contains the following components:

20 to 85 mass % phosphate ion,
0.5 to 20 mass % vanadate ion,
5 to 20 mass % metal ion,
2 to 60 mass % α,β-unsaturated carboxylic acid, and
1 to 20 mass % glycoluril resin.

Preferably, the organic resin layer is formed by applying one paint selected from the group consisting of a polyester-resin paint, a fluororesin paint, a vinyl-chloride-sol paint, and an acrylic-resin paint.

Preferably, the thickness of the organic resin layer is 0.1 to 4 μm.

EMBODIMENT FOR CARRYING OUT THE INVENTION

Figure 1:
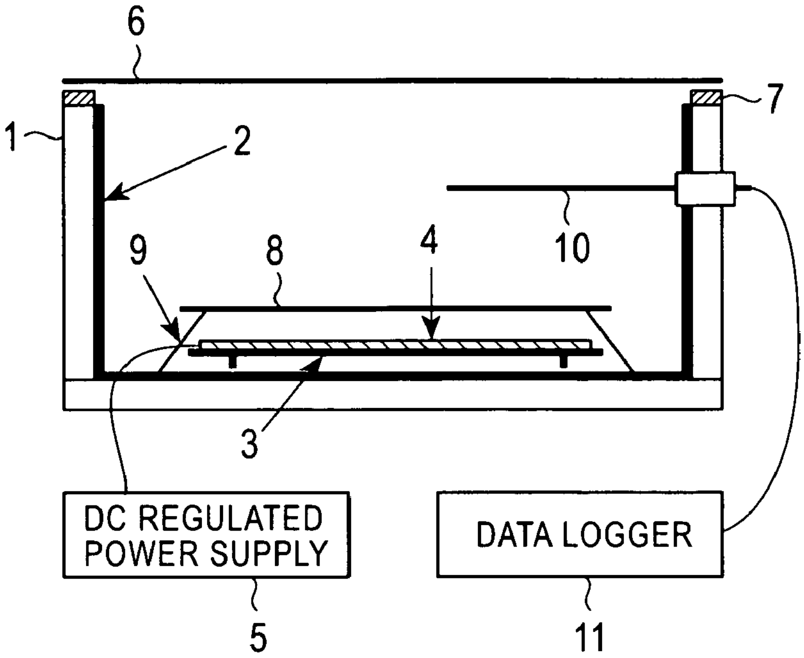
FIG. 1 is a schematic view of a device for heat absorption and dissipation tests.

A black galvanized steel sheet according to the present invention includes: a composite coating layer formed on the surface of a blackened galvanized steel sheet by application of a treatment solution containing a phosphate ion ($PO_4^{3-}$), a vanadate ion ($VO_3^-$), a metal ion, an α,β-unsaturated carboxylic acid and a glycoluril resin; and an organic resin layer on the surface of the composite coating layer. The black galvanized steel sheet is not only excellent in heat absorption and dissipation, electrical conductance, and electromagnetic shielding but also excellent in corrosion resistance in flat parts and also in bent parts when the steel sheet is fabricated. The black galvanized steel sheet can be applied to a variety of practical uses.

The blackened galvanized steel sheet, which is used as a base material in the present invention, is prepared by a blackening treatment of a zinc or zinc-based alloy plated steel sheet such as a hot-dipped galvanized steel sheet, hot-dipped zinc-aluminum (Zn-5 mass % Al) coated steel sheet, or hot-dipped zinc-aluminum (Zn-55 mass % Al) coated steel sheet. A zinc-nickel alloy plated steel sheet is preferable because a black coating layer formed on the zinc-nickel alloy plated steel sheet by a blackening treatment has excellent adhesion and stable quality in mass-production. Preferably, the blackening treatment is carried out after usual treatments, such as hot water rinsing and alkaline degreasing, of a galvanized steel sheet.

In the blackened galvanized steel sheet, which is the base material according to the present invention, the black coating layers are formed by the blackening treatment of a galvanized layer surfaces. Preferably, the thickness of the black coating layer is 0.01 to 0.5 μm, more preferably, 0.05 to 0.2 μm. A film thickness less than 0.01 μm leads to inadequate blackening and may result in insufficient heat absorption and dissipation. A film thickness exceeding 0.5 μm may lead to a decrease in adhesion of the black coating layer to the galvanized steel sheet. The thickness of the black coating layer can be inspected by a transmission electron microscopic (TEM) observation or the like of a cross section of a cut thin film which is prepared with a focused ion beam (FIB) processing apparatus or the like.

Methods for blackening treatment is not limited and may be any general methods, i.e. electrochemical methods such as anode electrolysis, cathodization, and AC electrolysis; and methods such as displacement deposition of metals such as nickel, cobalt, and iron together with metal-oxides thereof. With these methods, a black coating layer containing oxide as a main component can be formed to blacken the galvanized steel sheet surface.

As the methods for blackening, from the viewpoint of stability, anode electrolysis of an electrolytic zinc-nickel alloy plated steel sheet having a zinc-nickel alloy layer is recommended. The anode electrolysis is carried out, for example, in a aqueous solution containing chlorate ions ($ClO_3^-$) of 5 to 100 g/L and sulfate ions ($SO_4^{2-}$) of 10 to 300 g/L, under the condition at a pH of 0.5 to 3.0, a temperature of 30° C. to 75° C., and an electric charge of 10 to 300 $C/dm^2$. The black coating layer formed on the galvanized steel sheet contains metals containing zinc and metal oxides thereof, and optionally contains hydroxides of these metals. The metals are zinc, nickel, and the like.

Composite coating layers according to the present invention are formed on the surfaces of the blackened galvanized steel sheet by application of a treatment solution containing phosphate ions, vanadate ions, metal ions, an α,β-unsaturated carboxylic acid and a glycoluril resin. For example, the composite coating layer is formed by applying the treatment solution, which is a phosphate aqueous solution containing a vanadate compound, a metal compound, an α,β-unsaturated carboxylic acid and a glycoluril resin, to the blackened galvanized steel sheet surfaces and then by drying the sheet.

Preferably, the total concentration of the phosphate ions, the vanadate ions, the metal ions, the α,β-unsaturated carboxylic acid and the glycoluril resin in the treatment solution is 10 to 30 mass % because of the easiness in the application and the drying. The solvent used is water, or a mixture of water and an organic or inorganic solvent miscible with water.

Since the treatment solution is acidic due to the phosphate ions, the application of the treatment solution causes partial dissolution of zinc from the galvanized layer and increases the zinc ion activity in the treatment solution. During the succeeding drying, all components in the treatment solution are concentrated and deposited on the black coating layer surface to form the composite coating layers containing the phosphate ions, the vanadate ions, the metal ions, the α,β-unsaturated carboxylic acid and the glycoluril resin.

Preferably, the pH of the treatment solution is 1.5 to, 4, more preferably, 2.5 to 3.5. The pH is adjusted, for example, by addition of ammonia. When the pH is lower than 1.5, the galvanized layer is excessively dissolved during the application of the treatment solution and the drying, and the galvanized layer and the black coating layer may be damaged. When the pH is higher than 4, various types of metal ions added to the treatment solution are not stable and precipitate as hydroxides. This may inhibit the application. The treatment solution is applied by general methods, for example, roll coating, spray coating, and bar coating.

Preferably, the maximum sheet temperature for the drying after the application of the treatment solution is 80° C. to 250° C., more preferably, 100° C. to 180° C. A temperature lower than 80° C. leads to a longer drying time, this is disadvantageous for application and drying in sequential lines. The temperature of 250° C. is enough for the drying. An excessively high drying temperature causes energy consumption loss.

Preferably, a coating weight of the composite coating layer according to the present invention is 0.02 to 1 $g/m^2$, more preferably, 0.05 to 0.5 $g/m^2$. A coating weight smaller than 0.02 $g/m^2$ leads to insufficient corrosion resistance. A coating weight exceeding 1 $g/m^2$ leads to an increase in surface electrical resistance and may result in insufficient electrical conductance and electromagnetic shielding.

Phosphate salts are deposited on the black coating layer from the treatment solution containing phosphate ions during the drying. This enhances the corrosion resistance and also stabilizes the metal ions in the treatment solution. The phosphate ions ($PO_4^{3-}$) are the main component of the treatment solution. The amount of the phosphate ions in the treatment solution is preferably 20 to 85 mass %, more preferably, 50 to 80 mass %, of the total amount of the phosphate ions, the vanadate ions, the metal ions, the α,β-unsaturated carboxylic acid and the glycoluril resin. When the amount is lower than 20 mass %, the deposition of the phosphate in the composite coating layer is insufficient and the corrosion resistance may be decreased. When the amount is higher than 85 mass %, the free phosphoric acid in the composite coating layer increases and the corrosion resistance may be decreased. This means that the phosphate ion content in the treatment solution is excessive, which is uneconomic.

The vanadate ions in the treatment solution enhance the corrosion resistance of the composite coating layer. The amount of the vanadate ions ($VO_3^-$) in the treatment solution is preferably 0.5 to 20 mass %, more preferably, 4 to 8 mass %, of the total amount of the phosphate ions, the vanadate ions, the metal ions, the α,β-unsaturated carboxylic acid and the glycoluril resin. An amount lower than 0.5 mass % may lead to insufficient corrosion resistance. An amount exceeding 20 mass % may cause a decrease in corrosion resistance. Such a high vanadate ion content renders the vanadate ions in the treatment solution instable and causes precipitation during the storage. Preferably, the vanadate ions are added to the treatment solution in form of salt such as sodium vanadate, potassium vanadate, and ammonium vanadate.

The α,β-unsaturated carboxylic acid in the treatment solution enhances adhesion of the composite coating layer to the black coating layer. Preferably, the-amount of the α,β-unsaturated carboxylic acid in the treatment solution is 2 to 60 mass %, more preferably, 10 to 30 mass %, of the total amount of the phosphate ions, the vanadate ions, the metal ions, the α,β-unsaturated carboxylic acid and the glycoluril resin. An amount lower than 2 mass % leads to an insufficient improvement in adhesion of the composite coating layer to the black coating layer. Consequently, the corrosion resistance may be inadequate for the use in bent parts. An amount exceeding 60 mass % may cause a decrease in electrical conductance and electromagnetic shielding. Examples of the α,β-unsaturated carboxylic acid include acrylic acid, methacrylic acid, crotonic acid, itaconic acid, maleic acid and fumaric acid.

The glycoluril resin in the treatment solution notably enhances adhesion of the composite coating layer to an organic resin layer such as a polyester resin layer, which is described later, to be formed on the composite coating layer. Preferably, the amount of the glycoluril resin in the treatment solution is 1 to 20 mass %, more preferably, 5 to 15 mass %, of the total amount of the phosphate ions, the vanadate ions, the metal ions, the α,β-unsaturated carboxylic acid and the glycoluril resin. An amount lower than 1 mass % leads to an insufficient improvement in adhesion of the composite coating layer to the organic resin layer. Consequently, the corrosion resistance may be inadequate for the use in bent parts. An amount exceeding 20 mass % may result in a decrease in electrical conductance and electromagnetic shielding.

The glycoluril resins are monomers represented by the under mentioned formula; polymer compounds of the monomer; condensation products of the monomer; or mixtures of the monomers, the polymer compounds, and the condensation products.

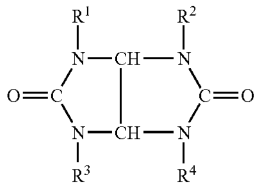

where the substituents $R^1$ to $R^4$ are each hydrogen, alkyl represented by $C_nH_{2n+1}$, or represented by $C_nH_{2n}OH$ or $C_nH_{2n}OC_mH_{2m+1}$; $R^1$ to $R^4$ are identical or different; m and n are integers from 1 to 4.

Examples of the monomers include glycoluril derivatives in which methylol, buthylol, or the like is added to all or part of 1-, 3-, 4-, and 6-amino groups; or alkyletherified derivatives of the glycoluril derivatives by methylation, methylation-ethylation, butylation, or the like.

Examples of the condensation products of the monomers include oligomers condensed at methylol group.

Tetramethylolglycoluril and its oligomers are preferable, since they exhibit excellent solubility and stability in the treatment solution.

The metal ions in the treatment solution densify the composite coating layer and enhance the corrosion resistance. Preferably, the metal ions are added to the treatment solution in the form of metal compounds such as oxide, carbonate, phosphate, nitrate, acetate, hydroxide, oxo-acid salts, borate, or fluoride of at least one element selected from the group consisting of Al, Mg, Mn, Zn, Co, Ti, Sn, Ni, Fe, Zr, Sr, Y, Nb, Cu, Ca, V, Ba, and Na. Phosphate, hydroxide, oxide, carbonate, nitrate and acetate are more preferable.

Phosphate, hydroxide, oxide, carbonate, nitrate and acetate of at least one metal ion selected from the group consisting of Mg, Zn, Mn, and Al are most preferable.

At least one type of metal is selected from the group consisting of Al, Mg, Mn, Zn, Co, Ti, Sn, Ni, Fe, Zr, Sr, Y, Nb, Cu, Ca, V, Ba, and Na for the addition to the treatment solution. From the viewpoint of improvement in corrosion resistance, the total amount of the metals added to the treatment solution is preferable 5 to 20 mass %, more preferably, 8 to 15 mass %, of the total amount of the phosphate ions, the vanadate ions, the metal ions, the α,β-unsaturated carboxylic acid and the glycoluril resin. The addition of the metal ions densifies the composite coating layer, resulting in high corrosion resistance. An amount lower than 5 mass % leads to an insufficient improvement in corrosion resistance of the composite coating layer. An amount exceeding 20 mass % causes coarseness of the deposit in the composite coating layer and may damage the corrosion resistance.

The black galvanized steel sheet according to the present invention includes the black coating layer, the composite coating layer, and also an organic resin layer formed on the composite coating layer. The formation of the organic resin film enhances the corrosion resistance in bent parts. The organic resin layer can be formed by application of a coating which is used for pre-coating of metals. Specifically, polyester-resin paint, fluorocarbon resin paint, vinyl-chloride-sol paint, acrylic-resin paint, or the like are used. Among them, polyester-resin paint, which is generally used as a paint for pre-coated steel sheets excellent in workability for household electrical products, is preferable.

The thickness of an organic resin layer in a known pre-coated steel sheet is larger than 10 μm. In the present invention, however, the thickness of 0.1 to 4 μm is preferable as the organic resin layer of the black galvanized steel sheet. The thickness of 0.5 to 2 μm is more preferable. A thickness less than 0.1 μm leads to insufficient alkali resistance. A thickness exceeding 4 μm may cause a decrease in electrical conductance and electromagnetic shielding.

The organic resin layer according to the present invention is formed on the composite coating layer by painting the paint compositions by the methods such as roll coating, spray painting, brush painting, dip painting, or curtain-flow painting; by pressing with ringer roll; and then by baking.

Preferably, the maximum sheet temperature for the baking is about 150° C. to 200° C. A temperature lower than 150° C. leads to rather insufficient curing of the organic resin layer because of remaining of the solvent in the organic resin layer. Consequently, the corrosion resistance may be slightly decreased. When the temperature is higher than 200° C., yellowing caused by part resolution of the components of the organic resin layer may occur, but the yellowing does not bring any problem.

EXAMPLE

Hereinafter, the present invention is described according to examples. The scope of the present invention is not limited to these examples.

Examples 1 to 25 and Comparative Examples 1 to 7.

In each of EXAMPLES 1 to 25 and COMPARATIVE EXAMPLES 1 to 7, a black galvanized steel sheet was manufactured by a forming black coating layer, a composite coating layer, and an organic resin layer on a galvanized steel sheet according to the following procedure. As a reference, an electro galvanized steel sheet (the plating weight: 20 $g/m^2$), which was not treated for blackening and not provided with a composite coating layer and an organic resin layer, was used.

[Formation of Black Coating Layer]

A cold-rolled steel sheet having a width of 1,200 mm and a thickness of 0.8 mm was plated on both sides with a zinc-nickel alloy in an electroplating line. The plating weight was 20 $g/m^2$ and the nickel content was 15 mass %. Then, black coating layers were formed on the both sides by anodization in a solution containing sodium chlorate and sodium sulfate (chlorate ion content: 80 g/L, sulfate ion content: 100 g/L, pH: 1.0, temperature: 50° C.) using a nickel counter electrode at a current density of 40 $A/dm^2$. The thickness of the black coating layer was adjusted by controlling the anodizing time. The black coating layer thicknesses are shown in Tables 1 and 2. The black coating layer thicknesses were measured by a transmission electron microscopic (TEM) observation of a cross section of a cut thin film which was prepared with a focused ion beam (FIB) processing apparatus.

[Formation of Composite Coating Layer]

A treatment solution (total solid content: 20 mass %) was prepared. Sodium vanadate (special grade), itaconic acid (Cica special grade), basic zinc carbonate (Cica special grade), aluminum hydroxide (Cica special grade), manganese hydroxide (Cica first grade), magnesium oxide (special grade), and tetramethylolglycoluril resin ("CYMEL1172"; Mitsui-Cytec Ltd.) were added to an aqueous ortho-phosphoric acid solution (special-grade phosphoric acid used). The amounts of the added content (solid contents) in the solution are shown in Tables 1 and 2. The pH was adjusted to 2.9 with ammonia water (Cica special grade).

A coating agent used for COMPARATIVE EXAMPLE 7 was prepared by 100.0 parts by mass of a water-soluble acrylic resin (polyacrylic acid; Kanto Chemical Co., Inc.), 2.5 parts by mass of a thiocarbonyl compound (thiourea; Kanto Chemical Co., Inc.), 1.0 parts by mass of a phosphate compound (ammonium phosphate; Kanto Chemical Co., Inc.), and 10.0 parts by mass of particulate silica (Snowtechs N; NISSAN CHEMICAL INDUSTRIES, LTD.) were added to deionized water. The total solid content of the coating agent was 20.0 mass %.

The treatment solution was applied on both black coating layers of the zinc-nickel alloy plated steel sheet with a roll coater, then the steel sheet was dried to form composite coating layers such that the maximum sheet temperature after 15 seconds reached 120° C.

In COMPARATIVE EXAMPLE 7, the coating agent was applied on both black coating layers of the zinc-nickel alloy plated steel sheet with a bar coater, then the steel sheet was heated to form films such that the maximum sheet temperature after 20 seconds reached 150° C.

Tables 1 and 2 show the coating weights of the composite coating layers and the films and the contents of the phosphate ions, vanadate ions, metal ions (zinc, aluminum, manganese, magnesium, and sodium), α,β-unsaturated carboxylic acid and glycoluril resin in the composite coating layers. The coating weights were determined by a fluorescent X-ray analysis with reference to a standard curve drawn according to the results of standard composite coating layers which were formed with treatment solutions having predetermined phosphate contents.

[Formation of Organic Resin Layer]

A coating solution was prepared by mixing a thinner ("V Nitto Thinner"; DAI NIPPON TORYO CO., LTD.) with a polyester-melamine resin PCM paint ("V Nitto No. 9900"; DAI NIPPON TORYO CO., LTD.) and adjusting the viscosity up to 20 seconds in Ford Cup No. 4 (at 25° C.). The painting solution was applied to the two composite coating layer surfaces of the steel sheet with the roll coater, and then the steel sheet was heated to form organic resin layers such that the maximum sheet temperature after 20 seconds reached 200° C. The thicknesses of the resulting organic resin layers are shown in Tables 1 and 2. The thicknesses were measured by cross-sectional scanning electron microscopic (SEM) observation.

The resultant organic resin layers of the black galvanized steel sheets were subjected to evaluation of adhesion, heat absorption and heat dissipation, corrosion resistance (in flat parts and bent parts), alkali resistance, electrical conductance, and electromagnetic shielding according to the following methods:

[Adhesion Test]

The black galvanized steel sheet was cut into a test piece having a length of 100 mm and a width of 50 mm. The test piece was bent to 90° with an outer radius of 1.5 mm to make a bent part. Adhesive tape (Cellotape; NICHIBAN CO., LTD.) was put along the outer-surface crease of the bent part, and then peeled off. Peeling of the composite coating layer and/or organic resin layer was determined by visual inspection of a change in color of the outside. The results are shown in Tables 3 and 4. "A" means no change in color, "B" means that color-changed area ratio is narrower than 5%, and "C" means that the ratio of the area with changed color is 5% or more. Here, the ratio of the area with changed color is a percentage of the total color-changed areas caused by peeling of the composite coating layer and/or organic resin layer to the total area of the bent parts on which the adhesive tape was stuck.

[Heat Absorption and Dissipation Tests]

Heat absorption and heat dissipation tests were carried out using a testing device shown in FIG. 1. A housing 1 (inside dimension: a length of 280 mm, a width of 280 mm, and a height of 110 mm; the top was completely opened) was assembled with acrylic resin plates (thickness: 2 mm). The interior of the housing 1 was laminated with an aluminum foil 2 (Alumifoil (trade name); Takeda Corporation) to completely cover the inner faces of the housing 1 (side faces and bottom face). A silicon-rubber heater 4 (AS ONE CORPORATION, a length of 150 mm, a width of 150 mm, a power density of 0.6 w/$cm^2$ when 100 V was applied) was placed on an aluminum table 3 arranged in the bottom center of the interior of the housing 1 such that the heater was at a height of 10 mm from the bottom. A voltage (maximum: 70 V, 1 A) was applied to the silicon-rubber heater 4 from a direct current regulated power supply 5 and heated (input power: 65 V×705 mA=45.8 W). The black galvanized steel sheet was cut into a test piece having a length of 300 mm and a width of 300 mm. The test piece was used as a top plate 6 and was put on the housing 1 so that the surface having the organic resin layer was in contact with a packing material 7 disposed on the top opening (top edges of the side faces) of the housing 1 and that the top plate 6 sealed the housing 1. An aluminum foil 8 (a length of 200 mm, a width of 200 mm) for preventing direct radiation from the silicon-rubber heater 4 to a sheathed platinum resistance thermometer 10 (mentioned below) was placed at a space between the sheathed platinum resistance thermometer 10 and the silicon-rubber heater 4. The aluminum foil 8 was arranged directly above the silicon-rubber heater 4 and at a height of 35 mm from the bottom and parallel to the bottom face. Four corners of the aluminum foil 8 was supported with wires 9 so that the position of the aluminum foil 8 was fixed.

The sheathed platinum resistance thermometer 10 (a diameter of 1.6 mm, a length of 150 mm) was inserted into the interior of the housing 1 from a side face of the housing 1 and was held in the center in the horizontal direction 35 mm below the top plate 6 and 40 mm above the aluminum foil 8. The sheathed platinum resistance thermometer 10 measured the temperature of an area in the center in the horizontal direction and about 35 mm below the top plate 6 in the vertical direction of the housing 1. A change in the internal temperature of the housing 1 was recorded in a data logger 11. The heat absorption and dissipation of the top plate 6 were determined based on the temperature when the internal temperature of the housing 1 reached a constant value. The internal temperature of the housing 1 was compared with that when the electrogalvanized steel sheet shown as the reference was used as the top plate 6. "A" means a temperature decrement of 5° C. or more, and "C" means less than 5° C. compared with that of the electrogalvanized steel sheet of the reference. The results are shown in Tables 3 and 4.

Figure 2:
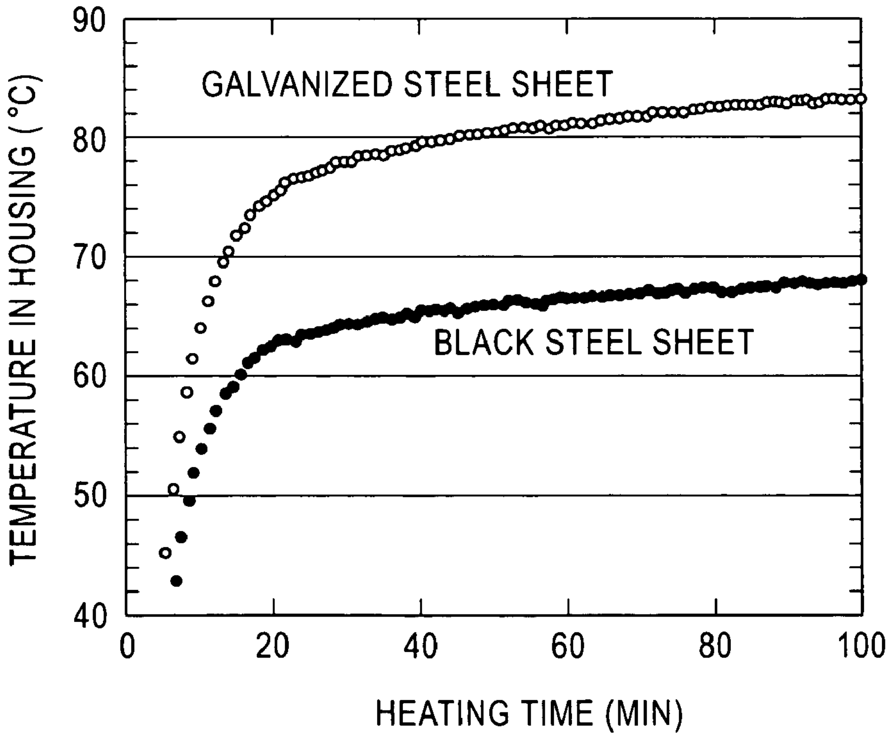
FIG. 2 is a graph showing heat absorption and heat dissipation in a black galvanized steel sheet having a composite coating layer and an organic resin layer of EXAMPLE 1 and in an electro galvanized steel sheet of a reference.

FIG. 2 is a graph showing the changes in the internal temperature of the housing 1 with the heating time when the electroglvanized-steel sheet of the reference and the black galvanized steel sheet of EXAMPLE 1 were used as the top plate 6. The internal temperature of the housing 1 in EXAMPLE 1 was lower than that in the reference. This indicates that the black galvanized steel sheet had high heat absorption and dissipation.

[Corrosion Resistance Test]

The black galvanized steel sheet was cut into a test piece having the same size as the adhesion test, and the test piece was bent to make a bent part. The test piece was applied to a cyclic salt-spray test (JIS Z 2371-2000; a repeating test of three cycles each consisting of a brine spraying step for 8 hours according to a neutral brine spray test and a settling step for 16 hours), and then white rust on the test piece was visually inspected. Both the bent portion and the flat portion, which was not bent and coated with the organic resin layer, of the test piece were inspected. "A" means no white rust, "B" means that the ratio of the area with white rust is less than 5%, and "C" means that the ratio of the area with white rust is 5% or more. The results are shown in Table 3 and 4. Here, the ratio of the area with white rust is a percentage of the total of the areas with white rust to the inspected area of the bent portion or flat portion.

[Alkaline Resistance Test]

The black galvanized steel sheet was cut into a test piece having a length of 100 mm and a width of 50 mm. The test piece was soaked in a degreasing solution (2 g/L CL-N364S; NIHON PARKERIZING CO., LTD.) at 60° C. for 2 minutes, and then retrieved. The change in color of the outside of the composite coating layer and/or organic resin layer was immediately inspected visually to determine the peeling. "A" means no color change. "B" means that color-changed area ratio is narrower than 5%, and "C" means that the ration of the area with changed color is 5% or more. The results are shown in Tables 3 and 4. Here, the ratio of the area with changed color is a percentage of the total of color-changed areas to the total inspected area.

[Electrical Conductance Test]

The black galvanized steel sheet was cut into a test piece having a length of 200 mm and a width of 100 mm. The electrical resistance of the test piece was measured with a surface resistivity meter (Loresta GP; MITSUIBISHI CHEMICAL CORPORATION) by a 4-pin ESP probe at a load of 240 g/pin at the surface having the organic resin layer. The electrical resistance was measured at 10 points: five arbitrary points in a lengthwise half, having a length of 200 mm and a width of 50 mm, of the test piece; and five arbitrary points in another lengthwise half of the test piece.

"A" means that all the ten points showed a resistance of less than 1 mΩ, "B" means that one or two of the ten points showed a resistance of 1 mΩ or more, and "C" means more than three points showed a resistance of 1 mΩ or more. The results are shown in Tables 3 and 4.

[Electromagnetic Shielding Test]

Figure 3:
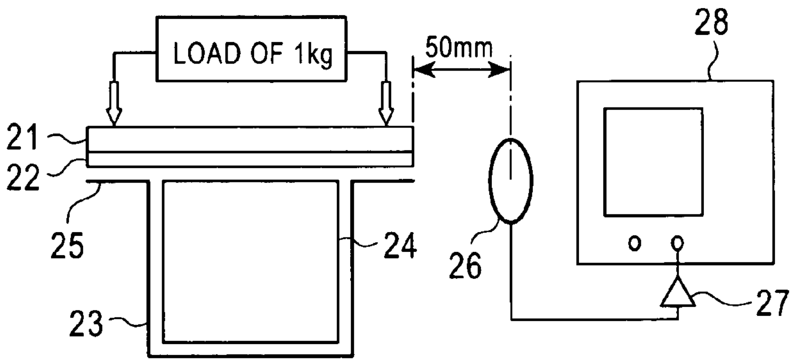
FIG. 3 is a block diagram for measuring leaking noise through a tubular electromagnetic shielding material.

In the present invention, the electromagnetic shielding was evaluated by measuring leaked noise as shown FIG. 3.

An Al housing 23 with outer dimensions of 100 mm×100 mm×100 mm was made with aluminum plates having a thickness of 2 mm. In the Al housing 23, a 20-MHz clock 24 was placed as an oscillator and output a high frequency of 20 to 1,000 MHz for every 20 MHz.

The top of the Al housing 23 was an opening of 100 mm×100 mm and had flanges 25 having a width of 20 mm protruding from the side faces so that the top face of the Al housing was shaped like a picture frame having outer dimensions of 140 mm×140 mm and a width of 20 mm. The black galvanized steel sheet was cut into a sample 21 (a thickness of 0.8 mm) having a size of 140 mm×140 mm. The sample 21 was placed on the top face of the Al housing 23 so that an evaluating surface 22 of the sample 21 was an under surface and come into contact with the top face of the Al housing 23. A vertical load of 1 kg was applied to the sample 21. Here, the evaluating surface 22 was one surface of the sample 21.

Leaked electromagnetic waves from the gap between the sample 21 and the flanges of the Al housing 23 were received by a loop antenna 26 having a diameter of 30 mm at a distance of 50 mm from the flange 25. The received electromagnetic waves were amplified by 25 dB through a preamp 27 and then measured by a spectrum analyzer 28 (R3162; ADVANTEST CORPORATION).

The electromagnetic shielding property was measured with the spectrum analyzer using the device shown in FIG. 3 as the leakage noise from the evaluating surface. The results are shown by charts in FIGS. 4 to 6.

Peak values having a difference of at least 3 dB from a background value were read at a frequency of 20 MHz to 1,000 MHz for every 20 MHz. The obtained values of EXAMPLES and COMPARATIVE EXAMPLES were converted to noise evaluation values (I) according to Formula 1:

$$I=10\log(10^{0.1d1}+10^{0.1d2}+\ldots+10^{0.1dn})\qquad \text{Formula 1}$$

wherein n represents the number of the peaks having a difference of at least 3 dB from the background value, and d1, d2, . . . , dn represents the difference between the peak value and the background value (the peak value had a difference of at least 3 dB)

Figure 4:
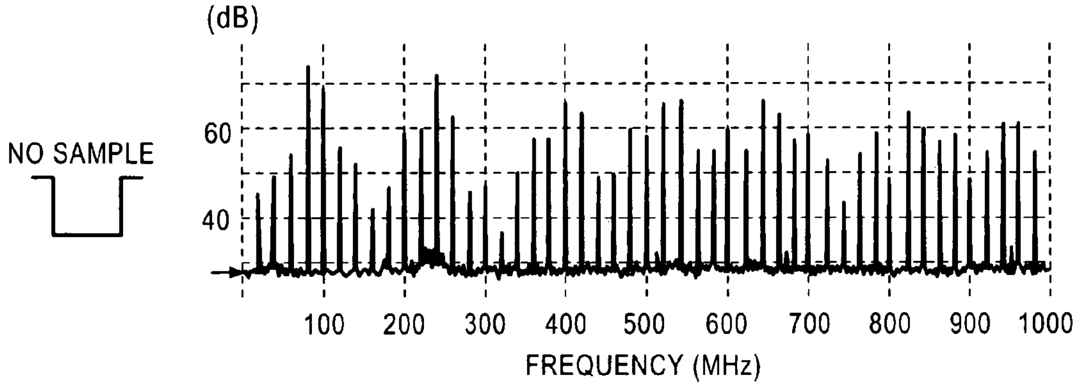
FIG. 4 shows a noise distribution measured at an open state in which a sample is not put on an Al housing in the device shown in FIG. 3.
Figure 5:
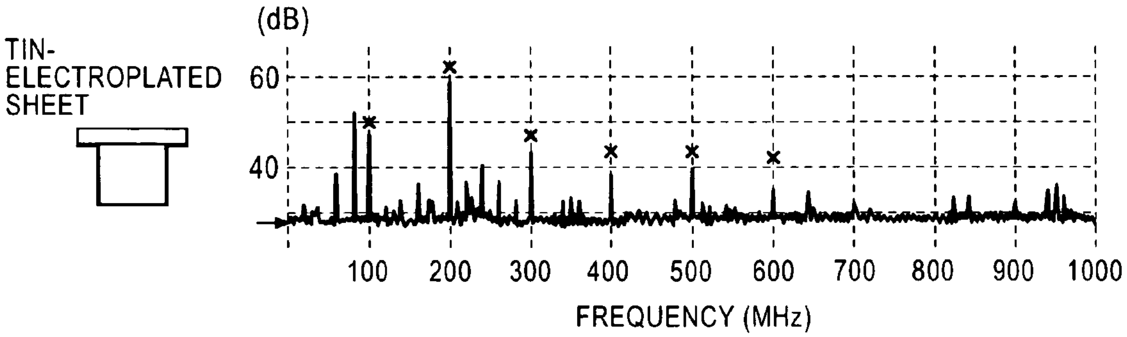
FIG. 5 shows a result of an electromagnetic shielding test in the case using a tin-electroplated sheet sample, which is a material used in practice.
Figure 6:
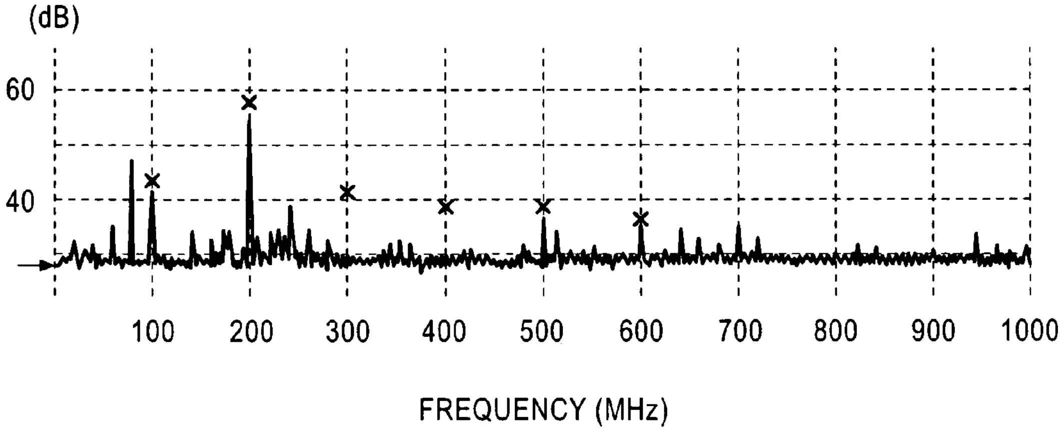
FIG. 6 shows a result of an electromagnetic shielding test of EXAMPLE 1.
Figure 7:
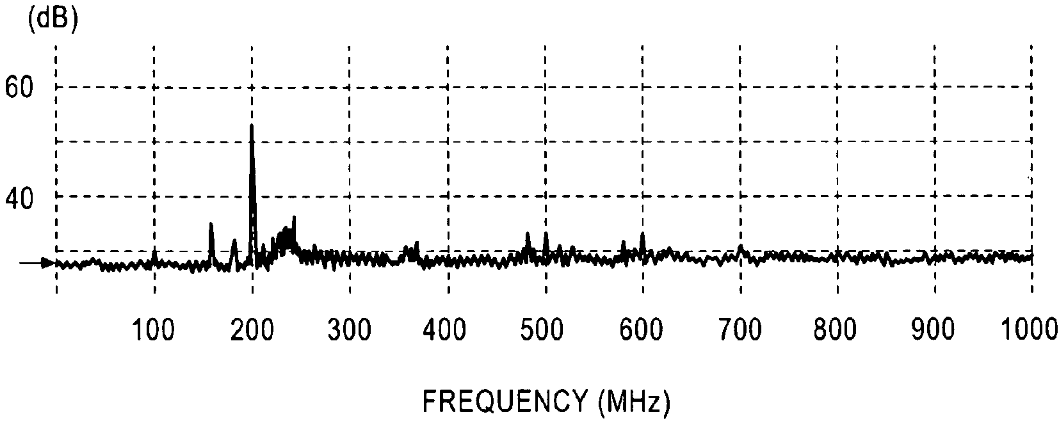
FIG. 7 shows an external noise distribution measured without high frequency oscillation and at an open state in which a sample is not put on the Al housing in the device shown in FIG. 3.

As references for evaluation, a result of a tin-electroplated sheet (plated tin weight: 2.8 g/m$^2$), which is used in practice at this time as a most suitable material in applications requiring a high electromagnetic shielding property, is shown in FIG. 5. The result of the EXAMPLE 1 is shown in FIG. 6. FIG. 4 shows an instance measured without a sample. FIG. 7 shows an instance measured without a sample and also a high frequency was not oscillated, that is, FIG. 7 shows an external noise. The differences (at least 3 dB) between the peak values read out from FIGS. 5 and 6 and the background (28 dB shown by arrows in FIGS. 4 to 7) were substituted in Formula 1, and the calculated values were shown as $I_0$ and I, respectively. Since peaks indicated by crosses in FIGS. 5 and 6 were derived from the extraneous noises shown in FIG. 7, the peak values of the peaks were not substituted in Formula 1.

Leaked noise from the materials of EXAMPLES and COMPARATIVE EXAMPLES were measured. "A" means $I/I_0 \leqq 1.2$, "B" means $1.2 < I/I_0 \leqq 1.4$, and "C" means $I/I_0 > 1.4$. The results are shown in Tables 3 and 4.

All of EXAMPLES 1 to 25 was excellent in adhesion, heat absorption and dissipation, corrosion resistance at flat and bent parts, alkali resistance, electrical conductance, and electromagnetic shielding. In contrast, COMPARATIVE EXAMPLE 1 without a black coating layer was inferior in heat absorption and dissipation; COMPARATIVE EXAMPLE 2 without an organic resin layer was inferior in corrosion resistance in the bent part and alkali resistance; and COMPARATIVE EXAMPLES 3 and 6 without a composite coating layer were inferior in adhesion, corrosion resistance in the flat and bent parts, and alkali resistance. In particular, COMPARATIVE EXAMPLE 6 having a thick organic resin layer of 10.0 µm was inferior in electrical conductance and electromagnetic shielding.

COMPARATIVE EXAMPLE 4 treated with a treatment solution not containing a vanadate compound was inferior in corrosion resistance in the flat and bent parts; COMPARATIVE EXAMPLE 5 treated with a treatment solution not containing a glycoluril resin was inferior in adhesion, corrosion resistance in the bent part, and alkali resistance; and COMPARATIVE EXAMPLE 7 treated with a coating agent containing a water soluble acrylic resin, a thiocarbonyl-group-containing compound, a phosphate compound, and particulate silica was inferior in adhesion, corrosion resistance in the bent part, alkali resistance, electrical conductance, and electromagnetic shielding.

TABLE 1

| | Black | Composite coating layer | | | | | | | | | | | |
|---|---|---|---|---|---|---|---|---|---|---|---|---|---|
| | coating layer Thickness | Coating weight | $PO_4^{3-}$ | $VO_3^-$ | Metal ion (mass %) | | | | | | α,β-unsaturated carboxylic | Glycoluril resin | Organic resin layer Thickness |
| | (µm) | (g/m$^2$) | (mass %) | (mass %) | Zn | Al | Mn | Mg | Na | Total | acid (mass %) | (mass %) | (µm) |
| EXAMPLE 1 | 0.15 | 0.10 | 69.0 | 6.8 | 4.8 | 0.5 | 3.4 | 2.0 | 1.6 | 12.3 | 6.7 | 5.2 | 1.0 |
| EXAMPLE 2 | 0.05 | 0.10 | 69.0 | 6.8 | 4.8 | 0.5 | 3.4 | 2.0 | 1.6 | 12.3 | 6.7 | 5.2 | 1.0 |
| EXAMPLE 3 | 0.08 | 0.10 | 69.0 | 6.8 | 4.8 | 0.5 | 3.4 | 2.0 | 1.6 | 12.3 | 6.7 | 5.2 | 1.0 |

TABLE 1-continued

| | Black coating layer Thickness | Composite coating layer | | | | | | | | | | | Organic resin layer Thickness |
|---|---|---|---|---|---|---|---|---|---|---|---|---|---|
| | | Coating weight | $PO_4^{3-}$ | $VO_3^-$ | Metal ion (mass %) | | | | | | α,β-unsaturated carboxylic | Glycoluril resin | |
| | (μm) | (g/m²) | (mass %) | (mass %) | Zn | Al | Mn | Mg | Na | Total | acid (mass %) | (mass %) | (μm) |
| EXAMPLE 4 | 0.50 | 0.10 | 69.0 | 6.8 | 4.8 | 0.5 | 3.4 | 2.0 | 1.6 | 12.3 | 6.7 | 5.2 | 1.0 |
| EXAMPLE 5 | 0.15 | 0.40 | 69.0 | 6.8 | 4.8 | 0.5 | 3.4 | 2.0 | 1.6 | 12.3 | 6.7 | 5.2 | 1.0 |
| EXAMPLE 6 | 0.20 | 0.20 | 69.0 | 6.8 | 4.8 | 0.5 | 3.4 | 2.0 | 1.6 | 12.3 | 6.7 | 5.2 | 1.0 |
| EXAMPLE 7 | 0.15 | 0.30 | 69.0 | 6.8 | 4.8 | 0.5 | 3.4 | 2.0 | 1.6 | 12.3 | 6.7 | 5.2 | 1.0 |
| EXAMPLE 8 | 0.15 | 0.05 | 69.0 | 6.8 | 4.8 | 0.5 | 3.4 | 2.0 | 1.6 | 12.3 | 6.7 | 5.2 | 1.0 |
| EXAMPLE 9 | 0.15 | 0.10 | 21.0 | 19.0 | 3.0 | 0.5 | 2.0 | 2.0 | 4.4 | 11.9 | 28.1 | 20.0 | 1.0 |
| EXAMPLE 10 | 0.15 | 0.10 | 40.0 | 12.0 | 4.8 | 0.5 | 3.4 | 2.0 | 2.8 | 13.5 | 19.5 | 15.0 | 1.0 |
| EXAMPLE 11 | 0.15 | 0.10 | 60.0 | 7.0 | 6.0 | 2.0 | 5.0 | 5.0 | 1.6 | 19.6 | 7.4 | 6.0 | 1.0 |
| EXAMPLE 12 | 0.15 | 0.10 | 79.0 | 3.5 | 4.8 | 0.5 | 2.0 | 2.0 | 0.8 | 10.1 | 4.4 | 3.0 | 1.0 |
| EXAMPLE 13 | 0.15 | 0.10 | 84.0 | 2.2 | 4.8 | 0.5 | 2.0 | 2.0 | 0.5 | 9.8 | 2.0 | 2.0 | 1.0 |
| EXAMPLE 14 | 0.15 | 0.10 | 69.0 | 0.6 | 4.8 | 0.5 | 3.4 | 2.0 | 0.1 | 10.8 | 11.6 | 8.0 | 1.0 |
| EXAMPLE 15 | 0.15 | 0.10 | 69.0 | 4.2 | 4.0 | 0.8 | 1.0 | 0.1 | 1.0 | 6.9 | 12.9 | 7.0 | 1.0 |
| EXAMPLE 16 | 0.15 | 0.10 | 69.0 | 6.8 | 4.8 | 0.5 | 3.4 | 2.0 | 1.6 | 12.3 | 6.7 | 5.2 | 0.2 |
| EXAMPLE 17 | 0.15 | 0.10 | 69.0 | 6.8 | 4.8 | 0.5 | 3.4 | 2.0 | 1.6 | 12.3 | 6.7 | 5.2 | 0.5 |
| EXAMPLE 18 | 0.15 | 0.10 | 69.0 | 6.8 | 4.8 | 0.5 | 3.4 | 2.0 | 1.6 | 12.3 | 6.7 | 5.2 | 2.0 |

TABLE 2

| | Black coating layer Thickness | Composite coaling layer | | | | | | | | | | | Organic resin layer Thickness |
|---|---|---|---|---|---|---|---|---|---|---|---|---|---|
| | | Coating weight | $PO_4^{3-}$ | $VO_3^-$ | Metal ion (mass %) | | | | | | α,β-unsaturated carboxylic | Glycoluril resin | |
| | (μm) | (g/m²) | (mass %) | (mass %) | Zn | Al | Mn | Mg | Na | Total | acid (mass %) | (mass %) | (μm) |
| EXAMPLE 19 | 0.20 | 0.3 | 69.0 | 6.8 | 4.8 | 0.5 | 3.4 | 2.0 | 1.6 | 12.3 | 6.7 | 5.2 | 0.05 |
| EXAMPLE 20 | 0.15 | 0.3 | 69.0 | 6.8 | 4.8 | 0.5 | 3.4 | 2.0 | 1.6 | 12.3 | 6.7 | 5.2 | 4.00 |
| EXAMPLE 21 | 0.15 | 1.2 | 69.0 | 6.8 | 4.8 | 0.5 | 3.4 | 2.0 | 1.6 | 12.3 | 6.7 | 5.2 | 1.00 |
| EXAMPLE 22 | 0.15 | 0.3 | 19.0 | 10.0 | 4.8 | 0.5 | 3.4 | 2.0 | 2.3 | 13.0 | 35.0 | 23.0 | 1.00 |
| EXAMPLE 23 | 0.15 | 0.3 | 86.0 | 1.0 | 3.5 | 0.5 | 2.9 | 2.0 | 0.2 | 9.1 | 1.9 | 2.0 | 1.00 |
| EXAMPLE 24 | 0.15 | 0.3 | 69.0 | 6.8 | 1.0 | 0.0 | 0.0 | 2.0 | 1.6 | 4.6 | 11.6 | 8.0 | 1.00 |
| EXAMPLE 25 | 0.15 | 0.3 | 62.0 | 6.8 | 6.0 | 6.0 | 5.0 | 2.5 | 1.6 | 21.1 | 5.1 | 5.0 | 1.00 |
| COMPARATIVE EXAMPLE 1 | 0.00 | 0.3 | 69.0 | 6.8 | 4.8 | 0.5 | 3.4 | 2.0 | 1.6 | 12.3 | 6.7 | 5.2 | 1.00 |
| COMPARATIVE EXAMPLE 2 | 0.15 | 0.3 | 69.0 | 6.8 | 4.8 | 0.5 | 3.4 | 2.0 | 1.6 | 12.3 | 6.7 | 5.2 | 0.00 |
| COMPARATIVE EXAMPLE 3 | 0.15 | 0.0 | — | — | — | — | — | — | — | — | — | — | 1.00 |
| COMPARATIVE EXAMPLE 4 | 0.15 | 0.3 | 75.0 | 0.0 | 4.8 | 0.5 | 3.4 | 2.0 | 0.1 | 10.8 | 8.2 | 6.0 | 1.00 |
| COMPARATIVE EXAMPLE 5 | 0.15 | 0.3 | 77.0 | 8.0 | 6.0 | 0.7 | 4.0 | 2.0 | 1.9 | 14.6 | 0.4 | 0.0 | 1.00 |
| COMPARATIVE EXAMPLE 6 | 0.15 | 0.0 | — | — | — | — | — | — | — | — | — | — | 10.00 |
| COMPARATIVE EXAMPLE 7 | 0.15 | 3.0* | — | — | — | — | — | — | — | — | — | — | 0.0 |

*Coating agent (mass ratio of solid content = water soluble acrylic resin:thiocarbonyl-group-containing compound:phosphate compound: particulate silica = 100.0:2.5:1.0:10.0),
"—" represents "not contained".

TABLE 3

| | Adhesion | Heat absorption and dissipation | Corrosion resistance in flat parts | Corrosion resistance in bent parts | Alkali resistance | Electrical conductance | Electro-magnetic shielding |
|---|---|---|---|---|---|---|---|
| EXAMPLE 1 | A | A | A | A | A | A | A |
| EXAMPLE 2 | A | A | A | A | A | A | A |
| EXAMPLE 3 | A | A | A | A | A | A | A |
| EXAMPLE 4 | A | A | A | A | A | A | A |
| EXAMPLE 5 | A | A | A | A | A | A | A |
| EXAMPLE 6 | A | A | A | A | A | A | A |
| EXAMPLE 7 | A | A | A | A | A | A | A |
| EXAMPLE 8 | A | A | A | A | A | A | A |

TABLE 3-continued

| | Adhesion | Heat absorption and dissipation | Corrosion resistance in flat parts | Corrosion resistance in bent parts | Alkali resistance | Electrical conductance | Electro-magnetic shielding |
|---|---|---|---|---|---|---|---|
| EXAMPLE 9 | A | A | A | A | A | A | A |
| EXAMPLE 10 | A | A | A | A | A | A | A |
| EXAMPLE 11 | A | A | A | A | A | A | A |
| EXAMPLE 12 | A | A | A | A | A | A | A |
| EXAMPLE 13 | A | A | A | A | A | A | A |
| EXAMPLE 14 | A | A | A | A | A | A | A |
| EXAMPLE 15 | A | A | A | A | A | A | A |
| EXAMPLE 16 | A | A | A | A | A | A | A |
| EXAMPLE 17 | A | A | A | A | A | A | A |
| EXAMPLE 18 | A | A | A | A | A | B | B |

TABLE 4

| | Adhesion | Heat absorption and dissipation | Corrosion resistance in flat parts | Corrosion resistance in bent parts | Alkali resistance | Electrical conductance | Electro-magnetic shielding |
|---|---|---|---|---|---|---|---|
| EXAMPLE 19 | B | A | A | B | B | A | A |
| EXAMPLE 20 | A | A | A | A | A | B | B |
| EXAMPLE 21 | A | A | A | A | A | B | B |
| EXAMPLE 22 | A | A | A | B | A | A | A |
| EXAMPLE 23 | A | A | B | B | A | A | A |
| EXAMPLE 24 | A | A | A | B | A | A | A |
| EXAMPLE 25 | A | A | B | B | A | A | A |
| COMPARATIVE EXAMPLE 1 | A | C | A | A | A | A | A |
| COMPARATIVE EXAMPLE 2 | A | A | A | C | C | A | A |
| COMPARATIVE EXAMPLE 3 | C | A | C | C | C | A | A |
| COMPARATIVE EXAMPLE 4 | A | A | C | C | A | A | A |
| COMPARATIVE EXAMPLE 5 | C | A | A | C | C | A | A |
| COMPARATIVE EXAMPLE 6 | C | A | C | C | C | C | C |
| COMPARATIVE EXAMPLE 7 | C | A | B | C | C | C | C |

What is claimed is:

1. A black galvanized steel sheet comprising:

a galvanized steel sheet;

a black coating layer formed on the galvanized steel sheet;

a composite coating layer formed on the black coating layer and containing a phosphate ion, a vanadate ion, a metal ion, an α, β-unsaturated carboxylic acid and a material comprising an unsubstituted or substituted glycoluril monomer, said material being selected from the group consisting of monomers; a polymer compound of the monomer; a condensation product of the monomer; a mixture comprising the monomer, the polymer compound and the condensation product, wherein the monomer is represented by the formula

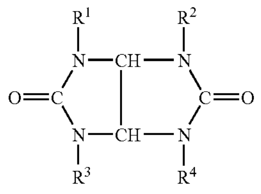

wherein $R^1$ to $R^4$ are identical or different and are hydrogen, $C_nH_{2n+1}$, $C_nH_{2n}OH$ or $C_nH_{2n}OC_mH_{2m+1}$, wherein m and n are integers from 1 to 4; and an organic resin layer formed on the composite coating layer.

2. The black galvanized steel sheet according to claim 1, wherein the black coating layer is formed by a blackening treatment of the surface of the galvanized steel sheet.

3. The black galvanized steel sheet according to claim 1, wherein the black coating layer has a thickness of 0.01 to 0.5 μm.

4. The black galvanized steel sheet according to claim 1, wherein the composite coating layer has a coating weight of 0.02 to 1 $mg/m^2$.

5. The black galvanized steel sheet according to claim 1, wherein the metal ion in the composite coating layer is at least one metal ion selected from the group consisting of a magnesium ion, a zinc ion, a manganese ion, and an aluminum ion.

6. The black galvanized steel sheet according to claim 1, wherein the composite coating layer is formed by applying a treatment solution on the black coating layer, the treatment solution containing a phosphate ion, a vanadate ion, a metal ion, an α, β-unsaturated carboxylic acid and the material comprising an unsubstituted or substituted glycoluril monomer.

7. The black galvanized steel sheet according to claim 6, wherein the metal ion in the treatment solution is at least one metal ion selected from the group consisting of a magnesium ion, a zinc ion, a manganese ion and an aluminum ion.

8. The black galvanized steel sheet according to claim 6, wherein the treatment solution contains the following components:

20 to 85 mass % of the phosphate ion, 0.5 to 20 mass % of the vanadate ion, 5 to 20 mass % of the metal ion, 2 to 60 mass % of the α, β-unsaturated carboxylic acid, and 1 to 20 mass % of the material comprising an unsubstituted or substituted glycoluril monomer.

9. The black galvanized steel sheet according to claim 1, wherein the organic resin layer is formed by applying one paint selected from the group consisting of a polyester-resin paint, a fluororesin paint, a vinyl-chioride-sol paint, and an acrylic-resin paint.

10. The black galvanized steel sheet according to claim 1, wherein the organic resin layer has a thickness of 0.1 to 4 μm.

11. The black galvanized steel sheet according to claim 1, wherein the unsubstituted or substituted glycoluril monomer is tetramethyloiglycoluril.

12. The black galvanized steel sheet according to claim 1, wherein the black coating layer has a thickness of 0.05 to 0.2 μm; the composite layer has a coating weight of 0.05 to 0.5 $g/m^2$; and the organic resin layer has a thickness of 0.5 to 2 μm.

13. The black galvanized steel sheet according to claim 1, wherein the organic. resin layer is formed by applying a polymer-resin paint.

14. The black galvanized steel sheet according to claim 11, wherein the organic resin layer is formed by applying a polyester-resin paint.

15. The black galvanized steel sheet according to claim 12, wherein the organic resin layer is formed by applying a polyester-resin paint.

16. The black galvanized steel sheet according to claim 15, wherein the unsubstituted or substituted glycoluril monomer is tetramethylolglycoluril.

17. The black galvanized steel sheet according to claim 16, wherein the metal ion in the composite coating layer is at least one metal ion selected from the group consisting of magnesium ion, a zinc ion, a magnesium ion and an aluminum ion.

* * * * *